(12) United States Patent
Shilov et al.

(10) Patent No.: US 11,546,743 B2
(45) Date of Patent: Jan. 3, 2023

(54) NR V2X COMMUNICATIONS USING SIDELINK BANDWIDTH PARTS

(71) Applicant: Intel Corporation, Santa Clara, CA (US)

(72) Inventors: Mikhail Shilov, Nizhny Novgorod (RU); Alexey Khoryaev, Nizhny Novgorod (RU); Sergey Panteleev, Nizhny Novgorod (RU); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/252,716

(22) PCT Filed: Oct. 29, 2019

(86) PCT No.: PCT/US2019/058530
§ 371 (c)(1),
(2) Date: Dec. 15, 2020

(87) PCT Pub. No.: WO2020/092345
PCT Pub. Date: May 7, 2020

(65) Prior Publication Data
US 2021/0219112 A1     Jul. 15, 2021

Related U.S. Application Data
(60) Provisional application No. 62/755,117, filed on Nov. 2, 2018.

(51) Int. Cl.
*H04W 4/40* (2018.01)
*H04W 72/02* (2009.01)
(Continued)

(52) U.S. Cl.
CPC .............. *H04W 4/40* (2018.02); *H04W 72/02* (2013.01); *H04W 72/0453* (2013.01); *H04W 76/27* (2018.02)

(58) Field of Classification Search
CPC ......... H04W 4/40; H04W 4/44; H04W 4/027; H04W 72/02; H04W 72/0453;
(Continued)

(56) References Cited

U.S. PATENT DOCUMENTS

| 11,115,098 B2* | 9/2021 | Islam ................... H04B 7/0636 |
| 2018/0027563 A1* | 1/2018 | Nguyen ................ H04L 5/0044 370/329 |

(Continued)

FOREIGN PATENT DOCUMENTS

WO    WO-2017122976 A1    7/2017

OTHER PUBLICATIONS

Huawei, HiSilicon, 3GPP TSG RAN WG1 Meeting #94bis,R1-1810138, Sidelink PHY structure and procedure for NR V2X, pp. 1-16 (Year: 2018).*

(Continued)

*Primary Examiner* — Farid Seyedvosoghi
(74) *Attorney, Agent, or Firm* — Schwegman Lundberg & Woessner, P.A.

(57) ABSTRACT

An apparatus of user equipment (UE) includes processing circuitry coupled to a memory, where to configure the UE for New Radio (NR) vehicle-to-everything (V2X) sidelink communication. The processing circuitry is to decode radio resource control (RRC) signaling from an authorized V2X network entity. The RRC signaling including configuration information to activate a sidelink transmit (TX) bandwidth part (BWP) of a plurality of sidelink TX BWPs within a sidelink carrier. Data is encoded for transmission to a second UE using a first sidelink signal. The processing circuitry is
(Continued)

SINGLE SL TX AND SL RX BWP W/ BW EQUAL TO CARRIER BW

MULTIPLE SL TX AND SL RX BWPS WITHIN CARRIER BW to cause transmission of the encoded data via the first sidelink signal. A bandwidth of the first sidelink signal during the transmission is within the activated sidelink TX BWP.

17 Claims, 6 Drawing Sheets

(51) Int. Cl.
*H04W 76/27* (2018.01)
*H04W 72/04* (2009.01)

(58) Field of Classification Search
CPC ... H04W 72/042; H04W 76/27; H04W 92/18; H04L 5/001; H04L 5/0098
See application file for complete search history.

(56) References Cited

U.S. PATENT DOCUMENTS

2018/0139778 A1* 5/2018 Chou .................. H04W 74/04
2018/0183551 A1   6/2018 Chou et al.

OTHER PUBLICATIONS

"International Application Serial No. PCT/US2019/058530, International Search Report dated Feb. 19, 2020", 3 pgs.

"International Application Serial No. PCT/US2019/058530, Written Opinion dated Feb. 19, 2020", 6 pgs.

Huawei, et al., "Sidelink PHY structure and procedure for NR V2X", R1-1810138, 3GPP TSG RAN WG1 Meeting #94bis, Chengdu, China, (Sep. 29, 2018).

Nokia, et al., "Discussions on NR V2X Sidelink Physical Layer Structures and Procedures", R1-1811427, 3GPP TSG RAN WG1 Meeting #94bis, Chengdu, China, (Sep. 29, 2018).

ZTE, "Initial consideration on NR V2X resource allocation", R2-1814168, 3GPP TSG-RAN WG2#103bis, Chengdu, China, (Sep. 28, 2018).

"International Application Serial No. PCT/US2019/058530, International Preliminary Report on Patentability dated May 14, 2021", 9 pgs.

* cited by examiner

NR V2X COMMUNICATIONS USING SIDELINK BANDWIDTH PARTS

PRIORITY CLAIM

This application is a U.S. National Stage Filing under 35 U.S.C. 371 from International Application No. PCT/US2019/058530, filed Oct. 29, 2019 and published in English as WO 2020/092345 on May 7, 2020 which claims the benefit of priority to the U.S. Provisional Patent Application Ser. No. 62/755,117, filed Nov. 2, 2018, and entitled "ENHANCED NEW RADIO VEHICLE TO EVERYTHING COMMUNICATION BY UTILIZING SIDELINK BANDWIDTH PARTS," each of which application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to systems and methods for enhanced New Radio vehicle-to-everything (V2X) communications by using sidelink bandwidth parts (BWPs).

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for enhanced NR V2X communications by using sidelink BWPs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
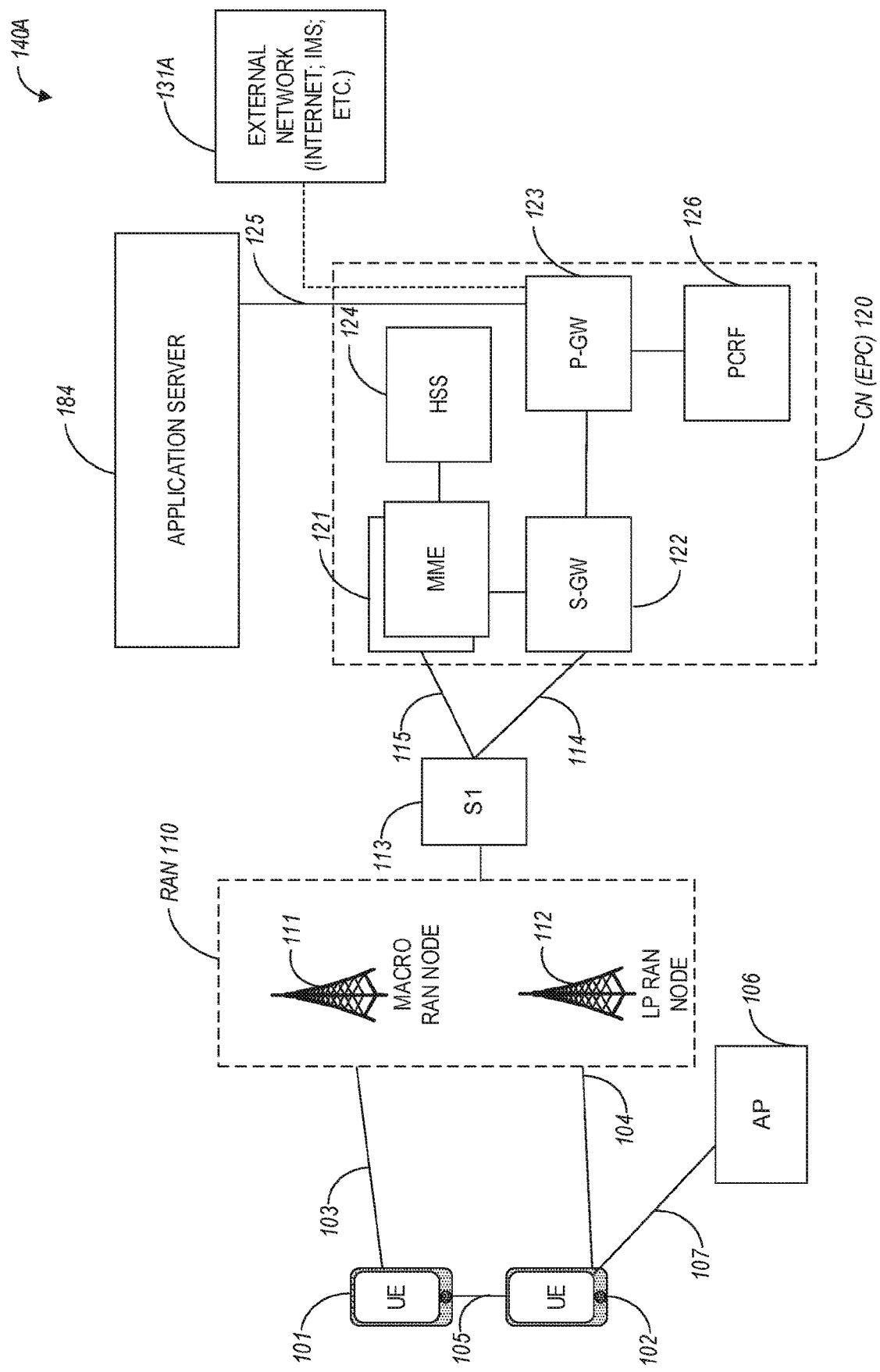
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
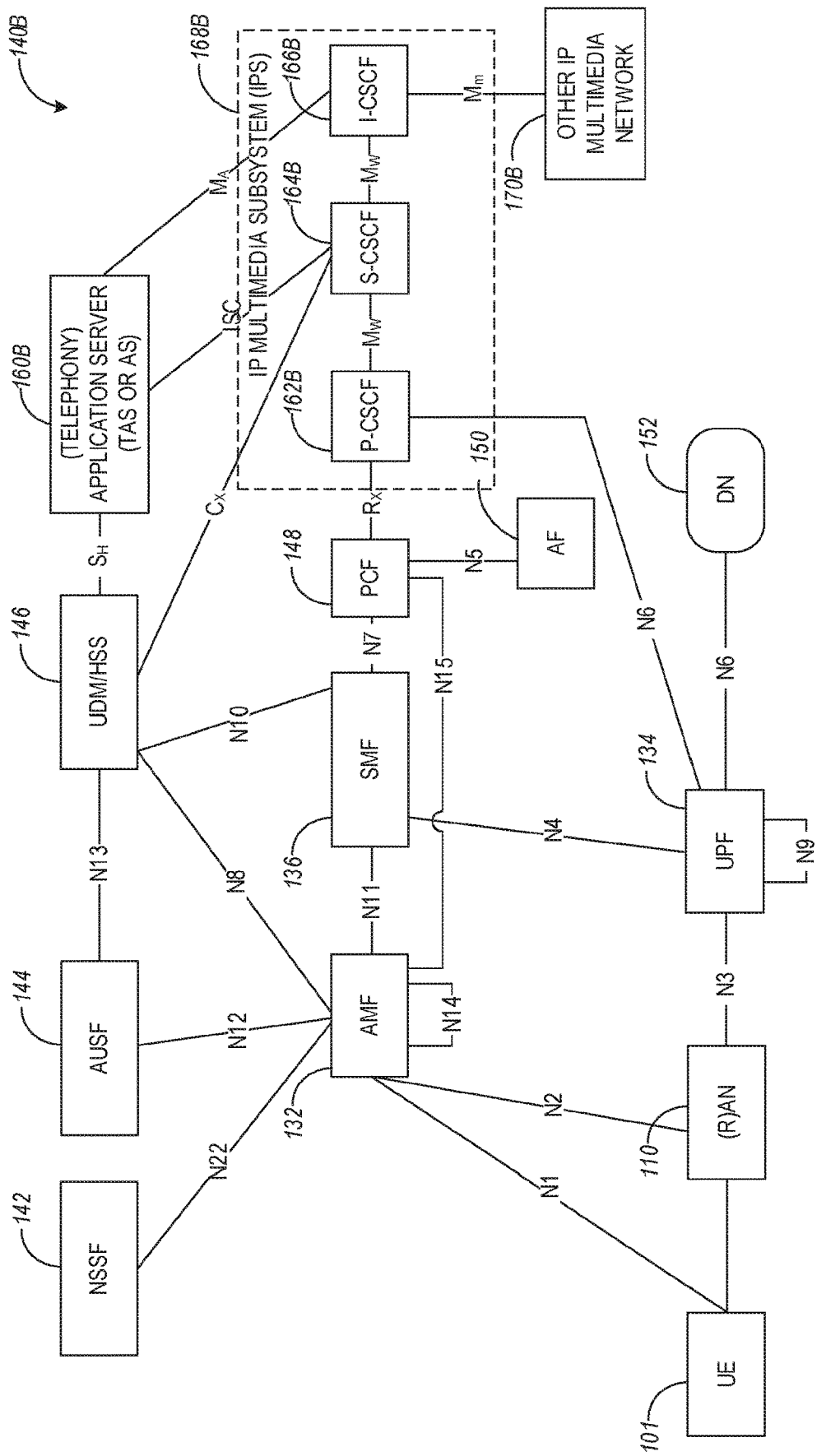
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services.

The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N1 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
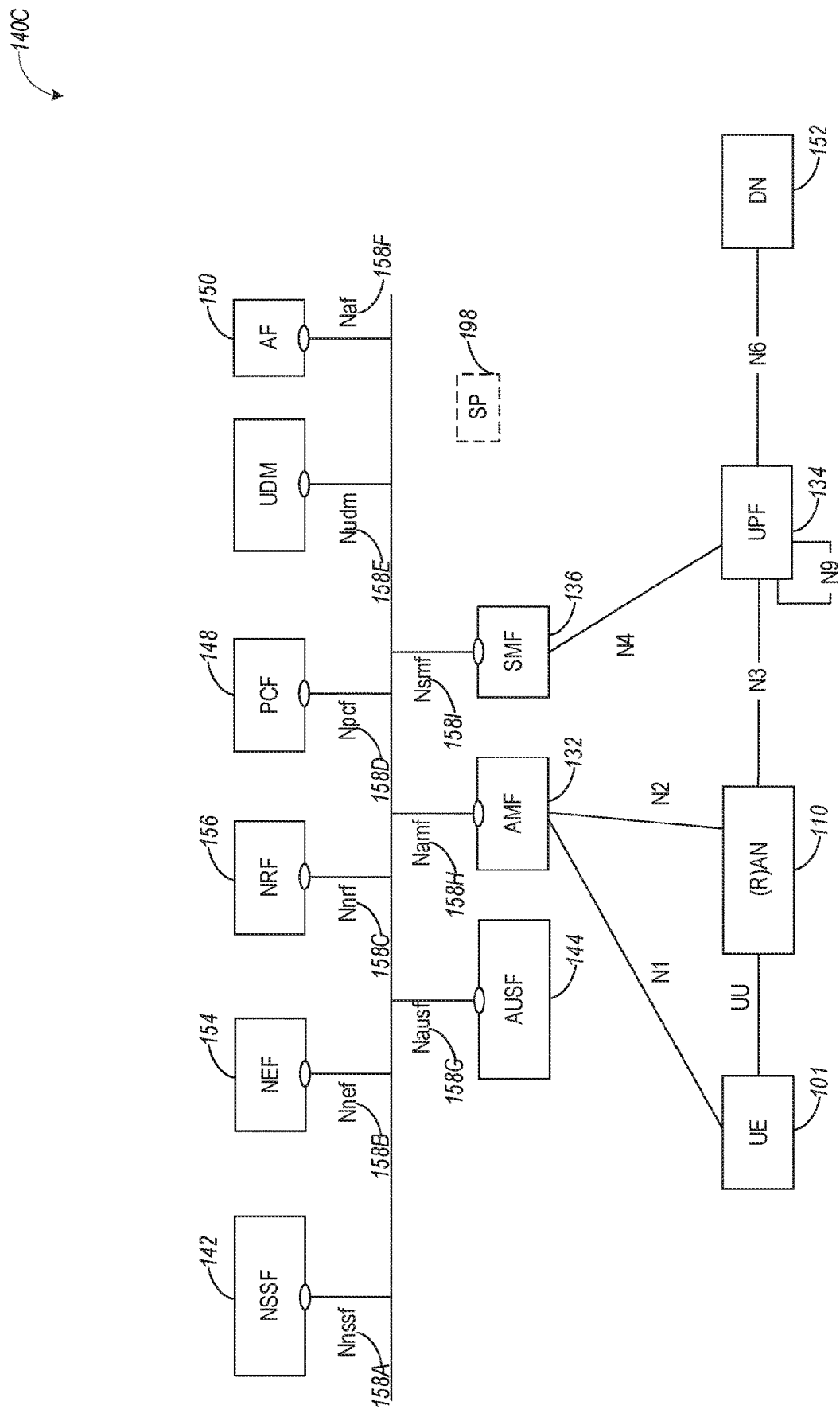

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

Techniques discussed herein can be used to provide support for BWPs in NR V2X sidelink communications and what benefits it can bring to the system. Using BWPs can improve NR V2X sidelink communication performance by reducing the level of in-band emissions (IBEs) and provide more reliability and flexibility to NR V2X sidelink communication. More specifically, the proposed BWPs concepts discussed herein facilitate reduced IBE level for NR V2X sidelink communication and provide additional flexibility to the NR-V2X system including support of various enhanced V2X (eV2X) services.

General concepts of using NR BWP for downlink (DL) and uplink (UL).

The motivation for support of BWPs in NR communications is to enable DL (RX) or UL (TX) bandwidth adaptation primarily driven by UE power-saving configurations. In general, there is no such motivation for sidelink V2X communication at least for considered so far V2X use cases. The main attributes of the NR V2X BWPs include:

In some aspects, DL and UL BWPs are configured within a carrier bandwidth. Partitioning of a carrier on BWPs may not impose any RF requirements in terms of signal leakage outside of the BWP and does not mandate/preclude UE to keep RF bandwidth to be equal to the BW of BWP. In some aspects, only carrier BW imposes RF requirements on signal leakage outside of the BWP.

In some aspects, DL and UL BWPs can be configured with different settings in terms of sub-carrier spacing (SCS), cyclic prefix (CP) length, location, and bandwidth (BW). In some aspects, for unpaired spectrum, active DL BWP and UL BWP may have the same center frequency.

In some aspects, different BWPs can overlap in frequency. In some aspects, BWPs are UE specifically configured, and up to 4 BWPs can be configured per UE in DL or UL.

In some aspects, only one BWP is active at a given time, and LTE Rel. 15 design assumptions may be applicable.

In some aspects, switching between BWPs is supported but may require additional time for switching. In some aspects, for UEs with Type-1 capabilities, BWP switching time varies depending on numerology (i.e., 1, 2, 3, 6 slots for 15, 30, 60 and 120 kHz respectively). In some aspects, for UEs with Type-2 capabilities, BWP switching time may vary depending on numerology (i.e., 3, 5, 9, 17 slots for 15, 30, 60, and 120 kHz respectively).

In some aspects, interruption due to BWP switching may be considered. A UE can have an interruption of 1, 1, 3, or 5 slots due to BWP switching for 15, 30, 60, and 120 kHz respectively. In some aspects, interruptions may not be allowed during BWP switch involving only baseband parameter change.

Techniques related to support of NR BWP for sidelink (SL) communications.

Enhancement #1—Transmit (TX) BWP adaptation to reduce IBE issues. For sidelink operation, it may be beneficial to have TX RF BW less than the carrier bandwidth to reduce the level of emissions outside the TX RF BW. In some aspects, the TX BWP concept can be used for that purpose. For instance, a UE may align the TX RF BW with the bandwidth of one of the (pre)-configured TX BWP(s). Depending on a selected sidelink transmission resource, the UE may activate the relevant TX BWP, so that the transmission signal BW is within the activated TX BWP (i.e., apply the principle of UE TX BWP adaptation). In another aspect, it may be assumed that the UE can tune TX RF bandwidth to fit the actual signal transmission BW (i.e., apply the principle of TX RF BW adaptation), however, this technique may impose additional complexity comparing to TX BWP adaptation.

Enhancement #2—Receive (RX) BWP adaptation to reduce the in-channel selectivity problem. In some aspects, UE RX BWP or UE RX RF BW adaptation may be used, however, this combination may cause inefficiencies unless it is assumed that different V2X services are mapped to different BWPs and one-to-one mapping b/w TX and RX BWPs is assumed.

Enhancement #3—V2X service mapping to BWPs. In some aspects, sidelink TX and RX BWPs can be used to map different V2X services across different BWPs. Various types of mapping are possible, including one-to-one (unicast), one-to-many (broadcast), many-to-one (groupcast), and many-to-many (multicast).

Figure 2A:
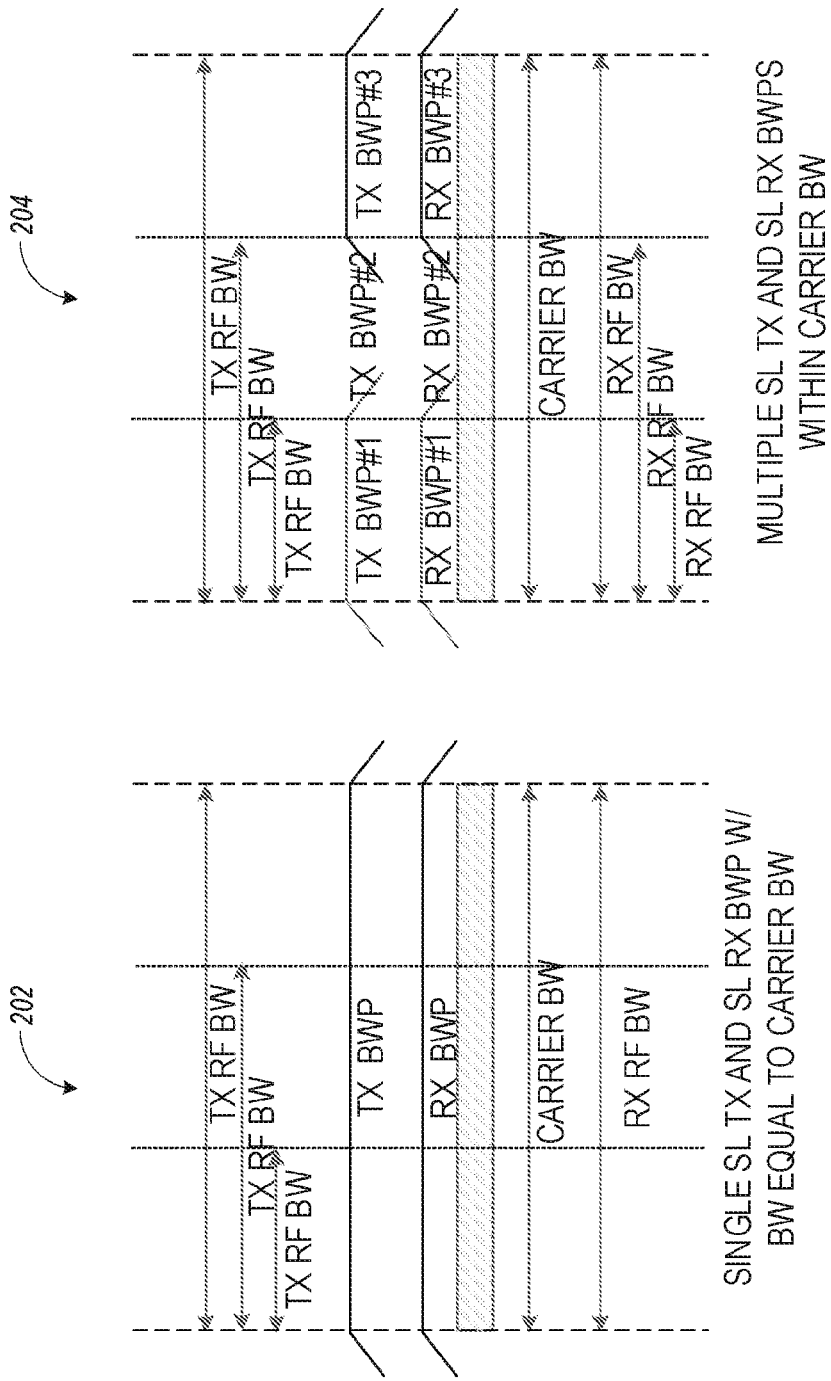
FIG. 2A and FIG. 2B illustrate sidelink BWP configuration options, in accordance with some aspects.
Figure 2B:
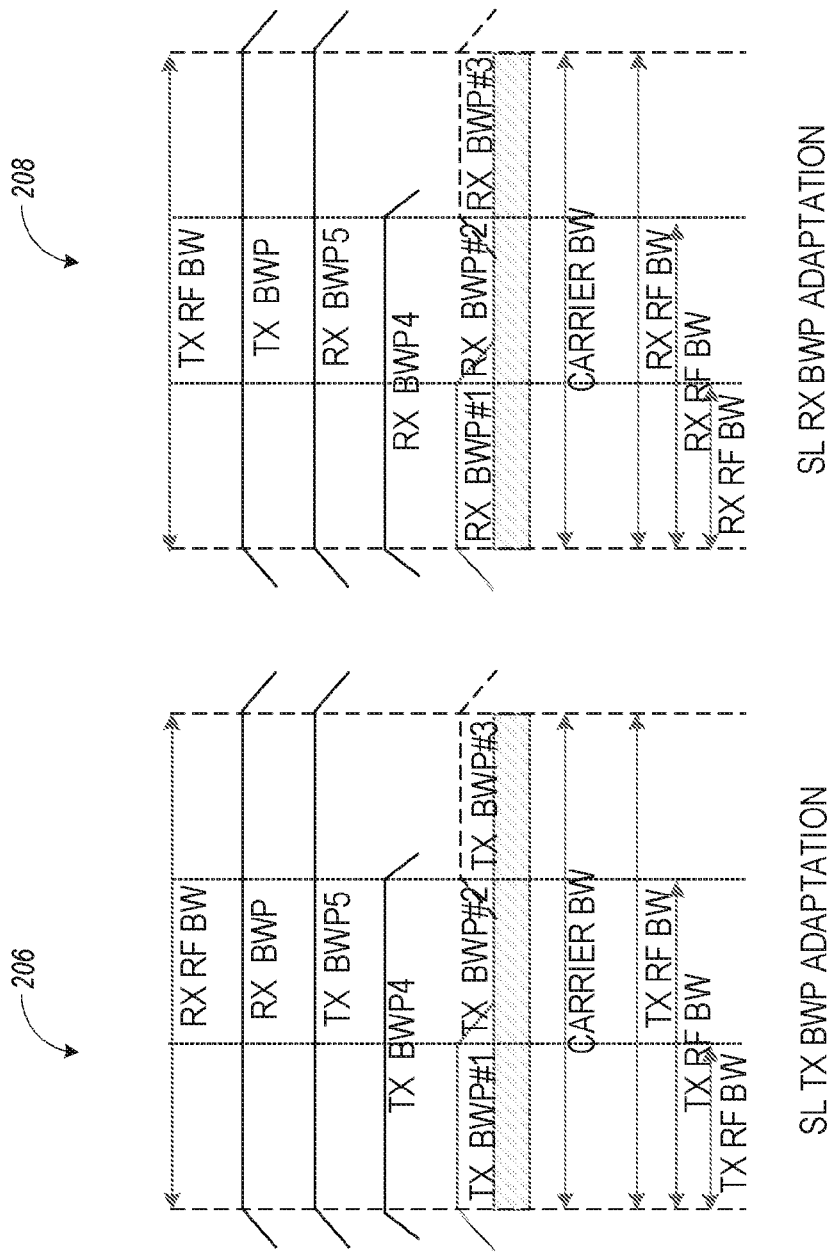

FIG. 2A and FIG. 2B illustrate sidelink BWP configuration options, in accordance with some aspects. Referring to FIG. 2A, BWP configuration 202 is associated with a single SL TX and SL RX BWP with BW equal to the carrier BW. More specifically, BWP configuration 202 is characterized by the following features: 1:1 mapping between TX and RX BWPs within a carrier BW, and UE TX radio frequency (RF) BW adaptation according to TX signal bandwidth location (e.g., tunable TX RF BW and location).

BWP configuration 204 is associated with multiple SL TX and SL RX BWPs within a carrier BW. More specifically BWP configuration 204 is characterized by the following features: 1:1 mapping between TX and RX BWPs within a carrier BW; UE TX RF BW adaptation according to TX signal bandwidth location; and UE RX RF BW adaptation according to RX bandwidth of interest.

Referring to FIG. 2B, BWP configuration 206 is associated with SL TX BWP adaptation. More specifically, BWP configuration 206 is characterized by the following features: multiple SL TX BWPs mapped to one SL RX BWP with carrier BW; UE TX RF BW equals the BW of a selected (active) TX BWP; and the UE RX RF BW equals the BW of the RX BWP.

Referring to FIG. 2B, BWP configuration 208 is associated with SL RX BWP adaptation. More specifically, BWP configuration 208 is characterized by the following features: multiple SL RX BWPs mapped to one SL TX BWP with carrier BW; the UE RX RF BW equals the BW of a selected (active) RX BWP; and the UE TX RF BW equals the BW of a TX BWP.

In some aspects, BWP configurations 202, 204, and 206 may be used with Enhancement #1 above, and BWP configurations 204 and 208 may be used with Enhancement #2 above.

Enhancement #4—SL BWPs associated with UE geo-location information, QoS information, or traffic type attributes. In some aspects, if UE location information is used for radio-resource management, the UE TX coordinates or a velocity vector can be used to determine which of the configured BWPs can be used for transmission or reception. In one embodiment, different BWPs can be allocated to cover opposite road transmission directions. In another embodiment, the different BWPs can be used to enable spatial reuse at the system level. In another embodiment, BWPs can be allocated to handle different traffic types (unicast, groupcast, broadcast) or QoS information (latency, priority, reliability, range, etc.)

In some aspects associated with sidelink operation, the following two options may be used with respect to sidelink BWPs:

Option 1: Different SL BWP configurations can be used from SL TX and RX perspective.

Option 2: The same SL BWP configuration is always applied to both TX and RX. In the case of Option 2, the SL BWP location and BW can be equal to the sidelink carrier BW and have the same SCS, CP length, and BW.

For Option 1, we further consider the following aspects provided below in Enhancement #5.

Enhancement #5: Sidelink BWP design aspects. In some aspects, the BWP concept allows retuning of UE RF parameters within a configured carrier, resulting in a reduced level of leakage/emissions outside of the BWP frequencies, which is beneficial for overall system performance. Considering these aspects, the following design aspects of BWP configuration for NR V2X sidelink communication may be used:

Aspect 1: Relationship of SL BWPs with respect to carrier BW. SL (TX/RX) BWPs may be configured within a carrier bandwidth and may allocate the full carrier BW. In some aspects, multiple SL BWPs within a given carrier are supported. In some aspects, up to four SL TX/RX BWPs can be configured.

Aspect 2: Relationship of SL TX and SL RX BWPs (or one SL BWP for TX and RX). In some aspects, the BW of an SL TX BWP is always within BW of SL RX BWP. In some aspects, different BWs of SL TX and RX BWPs are considered to at least address the IBE problem. In some aspects, it can be configured whether the center frequency of the TX and the RX BWP are the same.

Aspect 3: SL BWP settings (SCS, CP length, and BW location). In some aspects, at least from the UE perspective, the SL BWPs configured within a carrier have the same SCS and CP length. In some aspects, the BW and its location within a carrier can be different. In some aspects, the same settings can be applied across multiple carriers. In some aspects, different carriers may have different SCS, CP length, and BW location settings.

Aspect 4: Whether BWPs can overlap in frequency. In some aspects, SL BWPs may or may not overlap in frequency.

Aspect 5: UE-specific and common BWPs. In some aspects, the configuration of common sidelink BWPs may be supported. In some aspects, either UE-specific or common signaling can be used for that purpose. In some aspects, dedicated BWPs are supported, and a group of UEs can be assigned within a predefined BWP.

Aspect 6: Amount of active BWPs. In some aspects, only one active BWP may be used at a time from UE TX and RX perspective.

Aspect 7: Switching between BWPs. In some aspects, switching between SL TX BWPs may be supported. In some aspects, switching between SL RX BWPs may be supported.

Aspect 8: Relationship of SL BWPs and resource pools. In some aspects, the sidelink resource pool(s) can be allocated within a BW of a BWP. In some aspects, sidelink resource pool(s) can be allocated across multiple BWPs, at least from TX perspective.

Aspect 9: V2X service mapping to BWPs. In some aspects, different V2X services can be mapped to different V2X BWPs.

Aspect 10: UE TX/RX RF BW relationship with BWPs. In some aspects, the UE may be allowed to keep TX RF BW to cover single or multiple TX BWPs within a carrier BW, when one active wideband TX BWP covers multiple narrowband TX BWPs (i.e., a nested BWP structure). In some aspects, the UE may be allowed to keep RX RF BW to cover single or multiple RX BWPs within a carrier BW, when one active wideband RX BWP covers multiple narrowband RX BWPs (i.e., a nested BWP structure).

Aspect 11: Sidelink resource pool attributes. In some aspects, resource pools have the same SCS/CP length as BWPs that they belong to. In some aspects, a resource pool can aggregate multiple adjacent BWPs with the same SCS and CP length.

Aspect 12: Relationship with UL BWPs. In some aspects, from the UE perspective, UL and SL BWPs may have the same SCS and CP length. In some aspects, the UL and SL BWP locations within a carrier can be different. In some aspects, there may be no constraint that SL BWP is defined within a UL BWP. In some aspects, the transmission across SL and UL BWPs may be time-multiplexed (no need for simultaneous transmission).

The following aspects may be used in connection with NR SL resource pool attributes.

Aspect 1: Resource pool and contiguous resources in time and/or frequency. In some aspects, the sidelink resource pool includes contiguous resources in frequency, while the structure of the resources in time may be based on configuration (i.e., not necessary to be contiguous).

Aspect 2: RF bandwidth of the UE. In some aspects, in Mode-1, the base station (gNB) or an authorized network entity (ANE) does not control UE TX and RX RF bandwidth but can activate one of the configured TX/RX BWPs. Alternatively, the base station or the ANE can activate SL TX/RX BWP, and assume that UE TX and RX RF BW is larger or equal to the BW of SL TX/RX BWP.

In Mode-2, the base station (or ANE) is not aware of the UE TX and RX RF bandwidth as well as active BWPs. The UE may autonomously activate SL BWPs and TX/RX BW for sidelink transmissions, depending on multiple aspects starting from UE capability and V2X service mapping to spectrum resources, etc.

Aspect 3: BWP and sidelink resource pool. In some aspects, the BWP can be a part of a resource pool or contain a resource pool.

Aspect 4: Numerology aspects. In some aspects, for sidelink operation, numerology may be an attribute of the sidelink carrier. Alternatively, it is possible to formally keep it as an attribute of BWP assuming that from the UE perspective, all configured BWPs have the same numerology. Otherwise, the UE may be restricted to use a single BWP with fixed numerology at a time.

Aspect 5: Use of multiple resource pools when (pre-) configured. In some aspects, spatial reuse concepts may be applied for V2X sidelink communications. Another option is to associate different QoS attributes/metrics to different pools, etc.

Aspect 6: Relationship b/w PSCCH/PSSCH resource pools. In some aspects, physical sidelink control channel (PSCCH) and physical sidelink shared channel (PSSCH) resources may or may not overlap depending on the configuration.

In some aspects, a system, wherein the bandwidth part is introduced for sidelink V2X communication is disclosed and includes one or more of the following: sidelink TX BWP adaptation to reduce IBE; sidelink RX BWP adaptation to reduce in-channel selectivity issues; flexible V2X service mapping to sidelink BWPs; mechanism of radio-resource management where BWPs are associated with UE geo-location information; and sidelink BWP design aspects and relationships with sidelink resource pools. In some aspects, sidelink TX BWP adaptation to reduce IBE includes one or more of the following: partitioning of sidelink carrier on multiple TX BWPs; UE activation of sidelink TX BPW for transmission of sidelink signal so that sidelink signal bandwidth is within activated TX sidelink BWP; and switching between sidelink TX BWPs based on sensing and resource selection procedure operating over wideband RX BWP that covers multiple TX BWPs. In some aspects, sidelink RX BWP adaptation to reduce in-channel selectivity problem includes one or more of the following: partitioning of sidelink carrier on multiple RX BWPs; UE activation of sidelink RX BPW for reception of sidelink signal so that sidelink signal bandwidth is within activated RX sidelink BWP; and switching between sidelink RX BWPs based on service of interest. In some aspects, flexible V2X service mapping to sidelink BWPs includes one or more of the following: one-to-one mapping between TX/RX BWPs and a V2X service ID; many-to-one mapping between TX/RX BWPs and a V2X service ID; one-to-many mapping between TX/RX BWPs and a V2X service ID; and many-to-many mapping between TX/RX BWPs and a V2X service ID. In some aspects, a mechanism of sidelink radio-resource management where BWPs are associated with UE geo-location information or QoS information or traffic type attributes includes one or more of the following: selection of the TX BWP for transmission based on UE coordinate or its derivatives (velocity vector, travel direction, etc.); selection of the RX BWP for reception based on UE coordinate or its derivatives (velocity vector, travel direction, etc.); selection of the TX BWP for transmission based on QoS attribute (latency, priority, reliability, range etc.); and selection of the TX BWP for transmission based on traffic type attribute (unicast, groupcast, broadcast, etc.). In some aspects, sidelink BWP design aspects and relationships with sidelink resource pools comprise at least one of the aspects provided herein.

Figure 3:
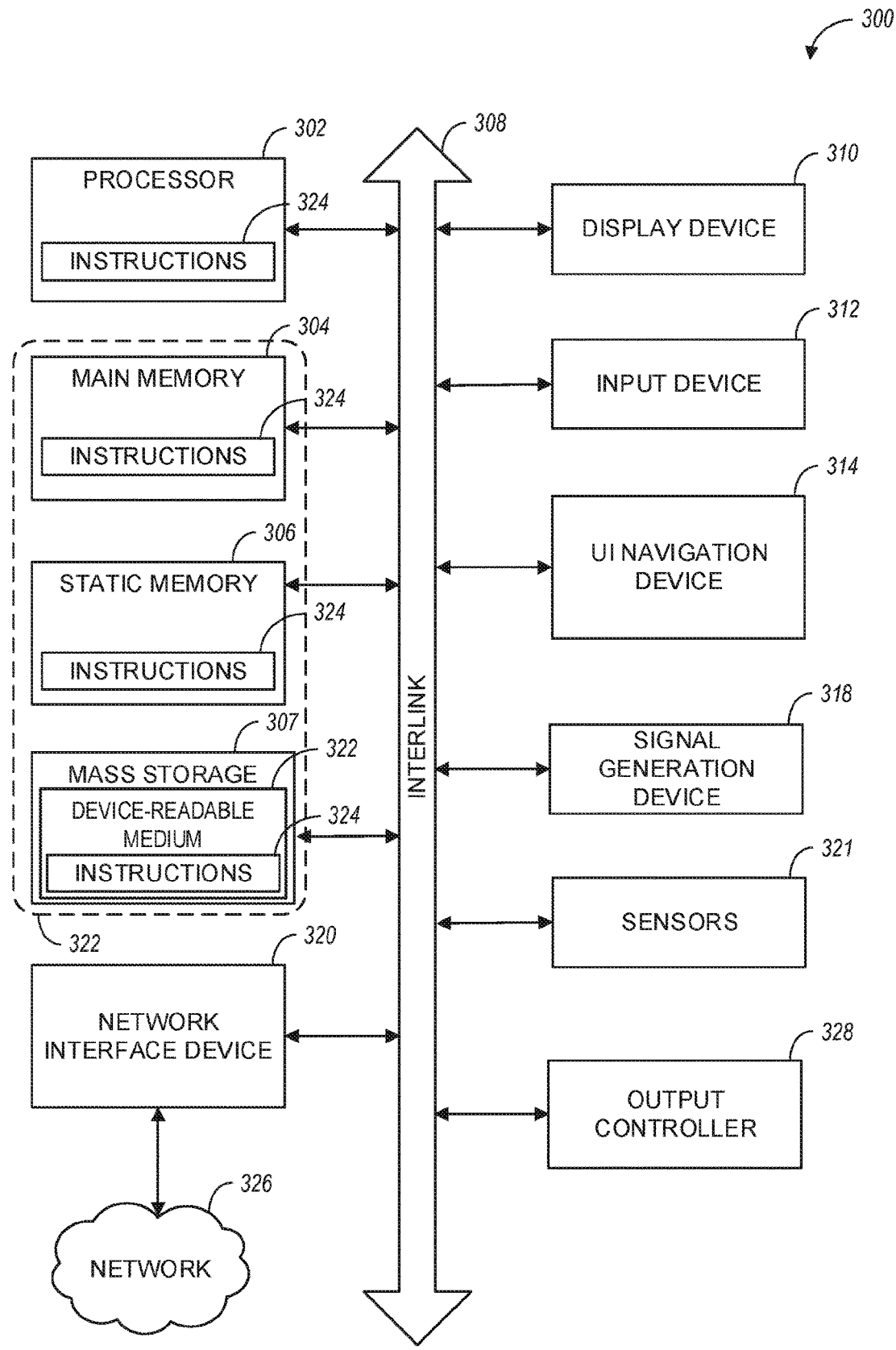
FIG. 3 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 3 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 300 may operate as a standalone device or may be connected (e.g., networked) to other communication devices.

Circuitry (e.g., processing circuitry) is a collection of circuits implemented in tangible entities of the device 300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 300 follow.

In some aspects, the device 300 may operate as a standalone device or may be connected (e.g., networked) to other devices. In a networked deployment, the communication device 300 may operate in the capacity of a server communication device, a client communication device, or both in server-client network environments. In an example, the communication device 300 may act as a peer communication device in peer-to-peer (P2P) (or other distributed) network environment. The communication device 300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 300 may include a hardware processor 302 (e.g., a central processing unit (CPU), a graphics processing unit (GPU), a hardware processor core, or any combination thereof), a main memory 304, a static memory 306, and mass storage 307 (e.g., hard drive, tape drive, flash storage, or other block or storage devices), some or all of which may communicate with each other via an interlink (e.g., bus) 308.

The communication device 300 may further include a display device 310, an alphanumeric input device 312 (e.g., a keyboard), and a user interface (UI) navigation device 314 (e.g., a mouse). In an example, the display device 310, input device 312 and UI navigation device 314 may be a touchscreen display. The communication device 300 may additionally include a signal generation device 318 (e.g., a speaker), a network interface device 320, and one or more sensors 321, such as a global positioning system (GPS) sensor, compass, accelerometer, or another sensor. The communication device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 307 may include a communication device-readable medium 322, on which is stored one or more sets of data structures or instructions 324 (e.g., software) embodying or utilized by any one or more of the techniques or functions described herein. In some aspects, registers of the processor 302, the main memory 304, the static memory 306, and/or the mass storage 307 may be, or include (completely or at least partially), the device-readable medium 322, on which is stored the one or more sets of data structures or instructions 324, embodying or utilized by any one or more of the techniques or functions described herein. In an example, one or any combination of the hardware processor 302, the main memory 304, the static memory 306, or the mass storage 316 may constitute the device-readable medium 322.

As used herein, the term "device-readable medium" is interchangeable with "computer-readable medium" or "machine-readable medium". While the communication device-readable medium 322 is illustrated as a single medium, the term "communication device-readable medium" may include a single medium or multiple media (e.g., a centralized or distributed database, and/or associated caches and servers) configured to store the one or more instructions 324. The term "communication device-readable medium" is inclusive of the terms "machine-readable medium" or "computer-readable medium", and may include any medium that is capable of storing, encoding, or carrying instructions (e.g., instructions 324) for execution by the communication device 300 and that cause the communication device 300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 324 may further be transmitted or received over a communications network 326 using a transmission medium via the network interface device 320 utilizing any one of a number of transfer protocols. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input-multiple-output (SIMO), MIMO, or multiple-input-single-output (MISO) techniques. In some examples, the network interface device 320 may wirelessly communicate using Multiple User MIMO techniques.

The term "transmission medium" shall be taken to include any intangible medium that is capable of storing, encoding or carrying instructions for execution by the communication device 300, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
   processing circuitry, wherein to configure the UE for New Radio (NR) sidelink communication, the processing circuitry is to:
   decode radio resource control (RRC) signaling to determine first configuration information and second configuration information, the first configuration information identifying a sidelink bandwidth part (BWP) and corresponding BWP numerology, the second configuration information identifying a resource pool within the sidelink BWP;

select an available slot from the resource pool based on the BWP numerology;

encode a sidelink transmission to a second UE, the sidelink transmission within a resource block (RB) of the available slot; and encode an uplink (UL) transmission to a base station, the UL transmission using the BWP numerology in an UL BWP; and memory coupled to the processing circuitry and configured to store the RRC signaling.

2. The apparatus of claim 1, wherein the BWP numerology comprises sub-carrier spacing (SCS) and cyclic prefix (CP) length used during the sidelink transmission.

3. The apparatus of claim 1, wherein the sidelink BWP is a sidelink transmit (TX) BWP of a plurality of sidelink TX BWPs within a sidelink carrier.

4. The apparatus of claim 3, wherein the processing circuitry is to:

partition physical resource block (PRB) resources of the sidelink carrier to obtain the plurality of sidelink TX BWPs.

5. The apparatus of claim 3, wherein the processing circuitry is to:

switch between the plurality of sidelink TX BWPs based on a sensing and resource selection procedure associated with a wideband receive (RX) BWP covering multiple sidelink TX BWPs of the plurality of sidelink TX BWPs.

6. The apparatus of claim 3, wherein the processing circuitry is to:

partition physical resource block (PRB) resources of the sidelink carrier to obtain a plurality of sidelink receive (RX) BWPs.

7. The apparatus of claim 6, wherein the configuration information further activates a sidelink RX BWP of the plurality of sidelink RX BWPs within the sidelink carrier.

8. The apparatus of claim 7, wherein the processing circuitry is to:

cause reception of a sidelink signal from the second UE using the activated sidelink RX BWP, wherein a bandwidth of the sidelink signal during the reception is within the activated sidelink RX BWP.

9. The apparatus of claim 1, further comprising transceiver circuitry coupled to the processing circuitry; and, one or more antennas coupled to the transceiver circuitry.

10. A non-transitory computer-readable storage medium that stores instructions for execution by one or more processors of a user equipment (UE), the instructions to configure the UE for New Radio (NR) sidelink communication, and to cause the UE to perform operations comprising:

decoding radio resource control (RRC) signaling to determine first configuration information and second configuration information, the first configuration information identifying a sidelink bandwidth part (BWP) and corresponding BWP numerology, the second configuration information identifying a resource pool within the sidelink BWP;

selecting an available slot from the resource pool based on the BWP numerology;

encoding a sidelink transmission to a second UE, the sidelink transmission within a resource block (RB) of the available slot; and encoding an uplink (UL) transmission to a base station, the UL transmission using the BWP numerology in an UL BWP.

11. The non-transitory computer-readable storage medium of claim 10, wherein the BWP numerology comprises sub-carrier spacing (SCS) and cyclic prefix (CP) length used during the sidelink transmission.

12. The non-transitory computer-readable storage medium of claim 10, wherein the sidelink BWP is a sidelink transmit (TX) BWP of a plurality of sidelink TX BWPs within a sidelink carrier.

13. The non-transitory computer-readable storage medium of claim the operations further comprising:

partitioning physical resource block (PRB) resources of the sidelink carrier to obtain the plurality of sidelink TX BWPs.

14. The non-transitory computer-readable storage medium of claim 12, the operations further comprising:

switching between the plurality of sidelink TX BWPs based on a sensing and resource selection procedure associated with a wideband receive (RX) BWP covering multiple sidelink TX BWPs of the plurality of sidelink TX BWPs.

15. The non-transitory computer-readable storage medium of claim 12, the operations further comprising:

partitioning physical resource block (PRB) resources of the sidelink carrier to obtain a plurality of sidelink receive (RX) BWPs, wherein the configuration information further activates a sidelink RX BWP of the plurality of sidelink RX BWPs within the sidelink carrier.

16. A non-transitory computer-readable storage medium that stores instructions for execution by one or more processors of a base station, the instructions to enable sidelink configuration in a 5G-New Radio (NR) network, and to cause the base station to perform operations comprising:

encoding radio resource control (RRC) signaling for transmission to a first user equipment (UE), the RRC signaling including first configuration information and second configuration information, the first configuration information identifying a sidelink bandwidth part (BWP) and corresponding BWP numerology for a sidelink transmission by the first UE to a second UE, the second configuration information identifying a resource pool within the sidelink BWP, and the sidelink transmission configured based on the BWP numerology and within a resource block (RB) of an available slot from the resource pool; and encoding an uplink (UL) transmission to a base station, the UL transmission using the BWP numerology in an UL BWP.

17. The non-transitory computer-readable storage medium of claim 16, wherein the BWP numerology comprises sub-carrier spacing (SCS) and cyclic prefix (CP) length used during the sidelink transmission.

* * * * *